June 7, 1938. W. A. RIDDELL 2,119,831
SETTING SHUTTER
Filed Feb. 3, 1937
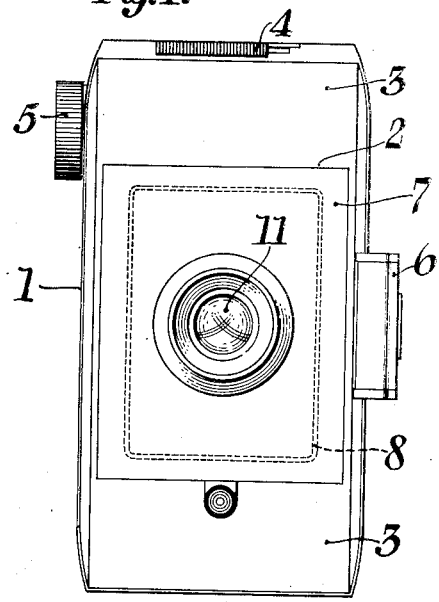
Fig. 1.
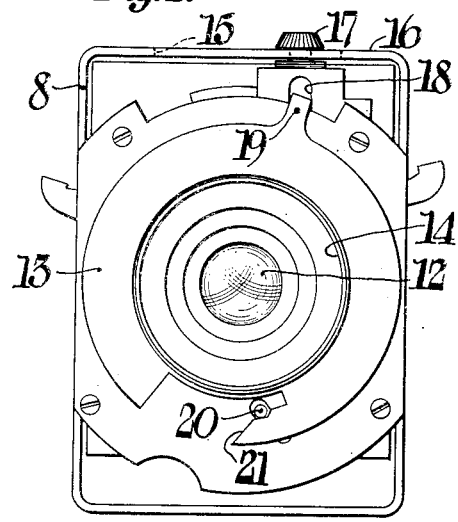
Fig. 2.
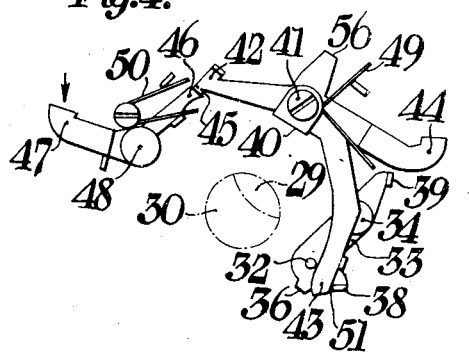
Fig. 4.
Fig. 5.
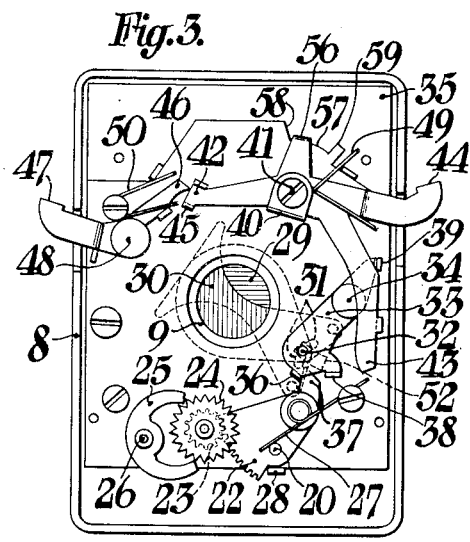
Fig. 3.
Fig. 6.
William A. Riddell,
INVENTOR:
BY Newton M. Perrin
Donald H. Stewart
ATTORNEY.

Patented June 7, 1938

2,119,831

UNITED STATES PATENT OFFICE 2,119,831

SETTING SHUTTER

William A. Riddell, Rochester, N. Y., assignor to Eastman Kodak Company, Rochester, N. Y., a corporation of New Jersey Application February 3, 1937, Serial No. 123,888

7 Claims. (Cl. 95—62)

This invention relates to photography, and more particularly to shutters for photographic cameras.

One object of my invention is to provide a shutter particularly adapted for use on small cameras in which the shutters may be released with a minimum effort. Another object of my invention is to provide a shutter of the setting type in which the master member may be manually moved to a position from which it is released to make an exposure. Another object of my invention is to provide a master member in the form of a three-armed lever, one arm being used for manually setting the master member and the other two arms being brought into cooperative relation with a trigger and a blade moving lever. Still another object of my invention is to provide a simple and relatively inexpensive camera shutter which is capable of making a variety of differently timed exposures, and other objects will appear from the following specification, the novel features being particularly pointed out in the claims at the end thereof.

Coming now to the drawing wherein like reference characters denote like parts throughout:

Fig. 1 is a front elevation of a camera including a shutter constructed in accordance with and embodying a preferred form of my invention.

Fig. 2 is an enlarged plan view of the shutter, but with the shutter cover plate removed.

Fig. 3 is a view similar to Fig. 2 with portions of the shutter removed.

Figs. 4 and 5 are fragmentary detail plan views showing a number of the shutter-operating parts in different positions.

Fig. 6 is a perspective view of the blade-operating lever.

It is desirable in small light-weight cameras to provide a shutter mechanism in which light pressure on the shutter trigger is all that is required to operate the shutter, because where the cameras have but little weight, it is somewhat difficult to prevent vibration of the camera when the shutter is released.

Setting shutters, of course, are well known, but in most instances such shutters have been comparatively complicated and expensive to make and are not particularly adapted for inexpensive miniature cameras.

I have provided an extremely simple type of camera shutter which is at the same time a setting shutter and which has the advantage of requiring but light pressure on the trigger to make an exposure.

In the drawing where a typical camera has been equipped with my improved shutter, Fig. 1 indicates a miniature camera designated broadly as I which may consist of a body portion 2 having the usual spool chambers 3 at each end and having a latch 4 for holding on a detachable back of a known type. There may be the usual winding key 5 and direct view finder 6, which is shown in a folded position.

In this type of camera, the shutter may be conveniently made rectangular in shape and may carry a shutter cover 7 which projects out beyond the edge of the shutter casing 8. The shutter casing is in the form of a shallow, box-like member having an exposure aperture 9 in the center through which light rays may pass to the film for making an exposure.

In the form shown, there may be a front lens element 11 supported on the shutter cover 7 and a rear lens element 12 supported by the shutter casing 8.

When the shutter cover 7 is removed from the shutter, as indicated in Fig. 2, it exposes the control cam 13 which is mounted to slide about the upstanding flange 14 in the following manner. A slot 15 is formed in the upper flange 16 of the shutter casing and there is a slide 17 adjustable along a scale on this flange which is to be moved for setting the shutter for the desired exposure. A shutter of the type shown in the drawing may be capable of giving exposures of $\frac{1}{10}$, $\frac{1}{25}$, $\frac{1}{50}$, and $\frac{1}{100}$ of a second, as well as time and bulb exposures. However, the variety of exposures is determined by the type of retarding mechanism which is employed.

The slide 17 is provided with a slot 18 which engages the arm 19 of cam ring 13, so that this ring may be oscillated and as it is moved, the pin 20 is allowed to assume different positions, in all of which the irregular cam 21 is engaged. Thus, the position of cam 21 controls the position of pin 20 and, as indicated in Fig. 3, pin 20 is carried by the gear segment 22 which operates a pinion 23, pallet wheel 24 and pallet 25, pivoted at 26, these members governing the amount of retard obtained. A spring 27 normally turns the gear segment 22 toward the stop 28 or normally turns the pin 20 into contact with the cam 21.

The shutter blades 29 and 30 are each provided with similar cam slots 31 which are engaged by a downwardly extending pin 32 carried by a shutter blade moving lever 33, this lever being pivoted at 34 to the shutter plate 35.

There are three lugs on the shutter moving lever. The first lug 36 extends downwardly and is adapted to engage an arm 37 on the gear segment 22. The second lug 38 extends upwardly, and, as best shown in Fig. 6, is a beveled lug and the third lug 39 extends upwardly a material distance, as shown also in Fig. 6.

The reason for lugs 38 and 39 is that they are the means by which the blade moving lever is driven first in one direction to open the shutter blades, and then in a second direction to close the shutter blades. This is done by means of a master member designated broadly as 40.

The master member 40 is a single integral member pivoted at 41 to the shutter plate 35 and having three main arms 42, 43 and 44. Arm 42 is provided with a downwardly extending beveled lug 45 which forms a surface against which the end 46 of a trigger 47, pivoted on a stud 48, may rest when the master member is moved to its operative position in which the spring 49 is placed under tension. This position is clearly shown in Fig. 4. A spring 50 normally holds the trigger 47 in a position in which it may engage the lug 45, this lug snapping over the end 46 of the trigger as the arm 44 of the master member is manually depressed. The trigger, therefore, holds the master member in its set position.

As the handle 44 is manually depressed, the arm 43 is likewise moved in a clockwise direction with reference to Fig. 3, so that the arm rides up over the beveled lug 38, snapping down into engagement with the upstanding straight edge 51 of this lug. This operation does not alter the position of the blade moving lever 33, since the pin 32 rests against the end of a slot 52 in passing down to the cam slots 31 in the shutter leaves.

By placing the spring 49 under tension through depressing the lever 44, the arms 42 and 43 are simultaneously positioned one in contact with the trigger and the other in contact with lug 38 of the blade moving lever, as indicated in Fig. 4. In this position the shutter parts are ready to make an exposure. By depressing the trigger 47 in the direction shown by the arrow, the end of the trigger will slide off the downwardly projecting lug 45 of the master member so that it may, under the impulse of spring 49, rapidly turn in a counter-clockwise direction with respect to Fig. 3. This movement does two things, first, the arm 43 will rock the blade moving lever 33 through the engagement of this arm and the lug 38. Thus, member 33 will swing about its pivot 34 until the arm 43 slips off the lug 38.

As shown in Fig. 5, where the parts are about ready for this slip-off, the blades have been opened and the exposure aperture 9 permits light to pass to the film. As the master member continues its movement so that arm 43 may slip off the lug 38, another portion of the arm 54 is brought into engagement with the upstanding lug 39 of the blade moving lever 33. As indicated in Fig. 6, this lug extends up a material distance so that the arm 43, which is flexible, cannot move over the top of the lug. Consequently, as the portion 54 of the arm strikes lug 39, the blade moving lever 33 will be driven in a reverse direction about its pivot 34 to positively close the shutter blades 29 and 30.

The master member 40 has an additional arm 56 which extends downwardly and is adapted to move over the curved surface 57 between the lugs 58 and 59 which may be positioned to limit the total movement of the master member. Thus, in setting the master member to tension spring 49 by means of the handle 44, arm 56 will come into contact with lug 59. When the master member has been released by pressure on the trigger 47, arm 56 will engage the stop 58.

Since the downwardly extending lug 36 may slip off the arm 37 of the retarding device, the position of the gear segment 22 controls the duration of the exposure. The time of slip-off, in other words, controls the time during which the shutter leaves are held in an open position.

As will be seen from the above description, I have provided an extremely simple type of shutter in which automatic exposures of short duration, as, for instance, $\frac{1}{25}$ or $\frac{1}{10}$ of a second can be made and in which the master member is manually placed under tension.

The operation of the shutter is extremely simple. The slide 17 is moved to the desired position, adjusting, through the pin 20, the position of the gear segment 22. Handle 44 of the master member is depressed until lug 45 engages the end 46 of trigger 47, this movement simultaneously causing the arm 43 to ride over the beveled lug 38 of the blade moving lever. It is only necessary to depress the trigger 47 to release the master member causing arm 43, through engagement with lug 38, to drive the blades open, and after a slip-off between these parts occurs, portion 54 of the arm strikes lug 39 and drives the blade operating lever in a reverse direction to close the blades. If the slide 17 has been set for an automatically prolonged exposure, the lug 36 of the blade moving lever 33 will engage arm 37. The duration of the exposure will depend on how soon the lug 36 may slip off the arm 37. This slip-off always occurs before arm 43 slips off lug 38, so that in slow shutter speeds, as, for instance, $\frac{1}{10}$ of a second, the gearing will retard the movement of lever 33 while it is being driven by arm 43 and lug 38 of the blade moving lever 33, this movement taking place under the impulse of spring 49.

I claim:

1. In a photographic shutter, the combination with a shutter casing having a light aperture therein, of leaves movably mounted in said casing and adapted to cover and uncover said aperture, a blade moving lever pivotally mounted on the shutter and operably connected to the shutter leaves, a trigger movably mounted on the shutter, a spring-operated master member pivotally mounted on the shutter and including spaced arms, one positioned to engage the trigger and another positioned to engage and move over the blade moving lever, and means comprising an arm also carried by the master member and extending through the shutter casing for simultaneously moving the other two arms of the master member into engagement with the trigger and blade moving lever, said trigger being movable to release the master member to operate the shutter leaves.

2. In a photographic shutter, the combination with a shutter casing having a light aperture therein, of leaves movably mounted in said casing and adapted to cover and uncover said aperture, a blade moving lever pivotally mounted upon the shutter and operably connected to the shutter leaves, a trigger pivotally mounted on the shutter and pressed by a spring in one direction, a master member movably mounted on the shutter, a spring adapted to turn the master member in one direction, said master member including a pair of spaced arms one positioned to engage the trigger and be latched thereby against the operation of the master member spring and the other positioned to engage the blade moving lever, both of said arms, when the master member is moved against its spring, being adapted to engage with the respective parts of the shutter, said pivot mounts for the blade moving lever, the trigger and the master member being so spaced that a master member arm may move the blade moving lever and then slip off said lever, and means extending through the shutter casing including a part of the master member for manually setting the master member against its spring, thereby positioning the arms of the master member into engagement with the trigger and blade moving lever, said trigger being adapted to release the master member to operate the shutter leaves as an arm of said master member rides against and finally slips off a portion of the blade moving lever.

3. In a photographic shutter, the combination with a shutter casing having a light aperture therein, of leaves movably mounted in said casing and adapted to cover and uncover said aperture, a blade moving lever pivotally mounted on the shutter and having two lugs extending from said lever, one on each side of said pivot, a trigger pivotally mounted on said shutter, a spring engaging said trigger to hold the trigger against the stop, a spring-actuated master member including spaced arms adapted to engage the trigger and blade moving lever lugs, a setting arm carried by the master member for manually moving the master member against spring pressure until latched by said trigger and simultaneously moving the other arm of the master member into contact with one lever lug, whereby pressure on the trigger may release the master member to move under the impulse of its spring for moving the blade lever by the first lug until it slips off said lug and continued movement of said master member arm may engage and move the blade lever through contact with the other lug.

4. In a photographic shutter, the combination with a shutter casing having a light aperture therein, of leaves movably mounted in said casing and adapted to cover and uncover said aperture, a blade moving lever movably mounted on the shutter and operably connected to the leaves, a trigger pivotally mounted on the shutter, a spring tending to hold the trigger against a stop, a master member pivotally mounted on the shutter and comprising a three-arm lever, one of said arms extending outside of said shutter casing and constituting a manually setting member, another of said arms extending into the path of said pivoted trigger and being adapted to be latched thereby with said master member spring under tension, the third of said arms extending toward and over the blade moving lever to operate said lever by striking separate parts thereof, whereby movement of the trigger may release said master member to turn upon its pivot under the influence of its spring to operate said shutter blades.

5. In a photographic shutter, the combination with a shutter casing having a light aperture therein, of leaves movably mounted in said casing and adapted to cover and uncover said aperture, a blade moving lever pivotally mounted on the shutter and operably connected to said leaves, a trigger pivotally mounted on said shutter, said blade moving lever being pivoted intermediate its ends, a lug extending upwardly from each end of said blade moving lever, a master member pivotally attached to the casing, a spring for moving the master member in one direction, said master member including an arm positioned to move across the pivoted blade moving lever and to engage the lugs carried thereby, the two pivotal supports being so positioned that said arm may engage and move one lug of the blade moving lever in one direction until a slip off occurs, and then to engage the other lug of said blade moving lever after crossing the pivotal support for said lever, said trigger being positioned to engage and hold the master member against the action of its spring when the latter is moved to a set position.

6. In a photographic shutter, the combination with a shutter casing having a light aperture therein, of leaves mounted in said casing and adapted to cover and uncover said aperture, a blade moving lever pivoted on the shutter and operably connected to said leaves, a trigger pivoted on the shutter and normally spring-pressed against a stop, said blade moving lever being pivoted intermediate its ends and carrying a beveled lug on one side of said pivot and an upstanding lug on the other side of said pivot, a master member pivotally mounted on the casing, the pivotal mounts for the master member, blade moving lever and trigger being so positioned that an arm carried by said master member may swing across the pivotal mount of the blade moving lever, said arm being flexible and being adapted to ride over the beveled lug in moving in one direction and being adapted to engage and move said lug until a slip off occurs in moving in an opposite direction under the influence of its spring, whereby said master member, when released by said trigger, may swing across the blade moving lever successively engaging its two lugs to swing the lever in two directions about its pivot, whereby an exposure may be made.

7. In a photographic shutter, the combination with a shutter casing having a light aperture therein, of leaves movably mounted in said casing and adapted to cover and uncover said aperture, a blade moving lever pivotally mounted on the shutter and operably connected to said blade, a trigger movably mounted on the shutter and normally spring-pressed against a stop, said blade moving lever being pivotally mounted to the shutter intermediate its ends, a beveled lug carried by one end of said lever and an upstanding lug carried by the other end of said lever, said lugs being on opposite sides of said pivoted mount, said pivoted master member including a resilient arm positioned to move across the path of the lugs carried by the blade moving lever being adapted to snap over the beveled lug in moving in one direction and to move with said lug until a slip off occurs in moving in an opposite direction, said upstanding lug being of such a height that the resilient arm may strike and move the lug but not drive over or pass the lug, whereby the blade moving lever may be moved in two directions to open and close the shutter leaves, a spring for moving said master member in a direction to operate the shutter blades, a setting lever carried by the master member, the setting lever and trigger both extending outside of the shutter casing, said trigger including an arm adapted to engage and hold the master member against the action of its spring in a set position, said arm being movable from the master member engaging position to release the master member to make an exposure.

WILLIAM A. RIDDELL.